July 20, 1943.  E. S. COOK  2,324,910
BRAKE VALVE DEVICE
Filed July 31, 1941
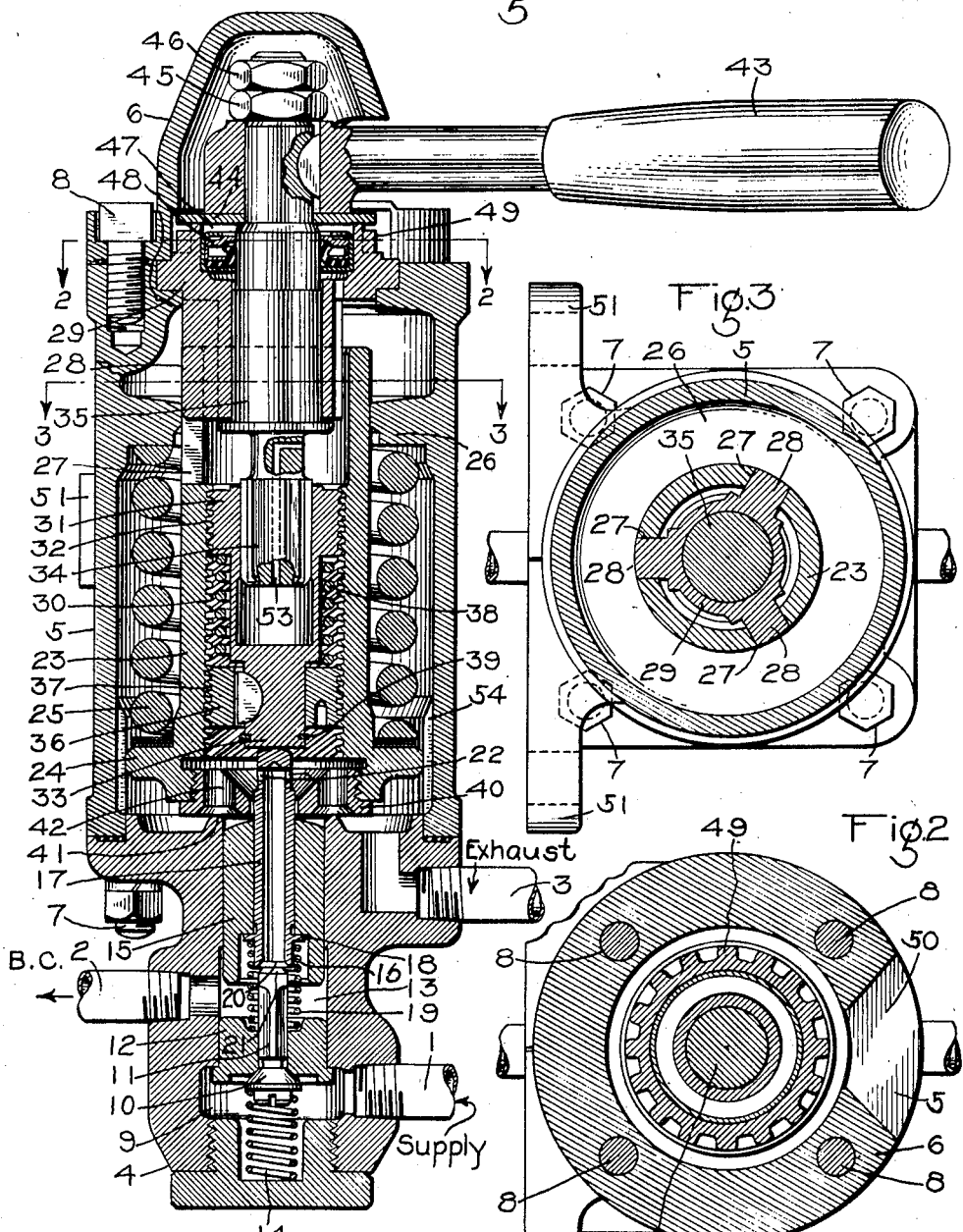
INVENTOR
EARLE S. COOK
BY
ATTORNEY Patented July 20, 1943

2,324,910

UNITED STATES PATENT OFFICE 2,324,910

BRAKE VALVE DEVICE

Earle S. Cook, Wilkinsburg, Pa., assignor to The Westinghouse Air Brake Company, Wilmerding, Pa., a corporation of Pennsylvania Application July 31, 1941, Serial No. 404,789

16 Claims. (Cl. 303—54)

This invention relates to control valve devices of the self-lapping type for use in controlling fluid pressure systems, such for instance, as fluid pressure brake systems for railway vehicles, automotive vehicles, and airplanes, fluid pressure controlled clutch systems, etc., and is particularly adapted for use in such systems where a hydraulic medium, such for instance as oil, is to be employed.

An object of the present invention is to provide an improved control device of the above mentioned type.

In hydraulic control valve devices of the self-lapping type heretofore proposed, the interengaging or contacting surfaces of the necessary relatively movable parts are so great in area that there is, at all times, an excessive frictional resistance to the relative movement of the parts which renders the valve as a whole sluggish or slow in its operation to its proper control positions, and as a consequence renders it almost impossible to effect the increase or decrease in the control pressure in the system in the small increments or steps which are necessary to insure the prompt and accurate control which is so essential in fluid pressure brake systems, clutch control systems, and other fluid pressure apparatus.

Another object of the invention is to provide a control valve device which is so constructed and the parts thereof so arranged that the frictional resistance between relatively movable parts thereof will be maintained at a minimum.

Another object of the invention is to provide a control valve device of the above mentioned type having improved means for maintaining the operating handle thereof in any control position to which it is moved, against movement to any other control position unless such movement is initiated by the operator. According to this object a friction means is provided which at all times loads the handle sufficiently to resist any tendency to move from any control position to which it has been moved. By reason of this loading the operating handle may be released in any of its control positions by the operator and it will remain in this position until moved therefrom by the operator. In practice it has been found that this loading may be so slight that the operator need only exert a maximum pressure of five or six pounds to move the handle from any control position to any other control position. This light loading will, as just pointed out, prevent the accidental movement of the operating handle from one control position to another and will permit the easy operation of the handle to provide slight increases or decreases in the control pressure.

Another object of the invention is to provide a control valve device of the above mentioned type with a casing which entirely encloses the movable parts of the device in such a manner as to insure against leakage of fluid from the device and entry of foreign matter from the atmosphere to the working parts thereof.

Other objects and advantages will appear in the following more detailed description of the invention.

Fig. 1 is a vertical sectional view through a control valve device constructed in accordance with the invention, the several parts of the device being shown in their normal or full release position; Fig. 2 is a cross sectional view through the device and taken on the line 2—2 on Fig. 1; Fig. 3 is a cross sectional view through the device taken on line 3—3 of Fig. 1.

For descriptive purposes only it will be assumed that the improved control device is employed as a brake valve device in a hydraulic brake system having a supply or inlet pipe 1 leading from a hydraulic accumulator or other pressure supply source, an application and release or outlet pipe 2 leading to a brake cylinder or brake cylinders and an exhaust pipe 3 leading to the usual liquid collecting sump. Only the pipes 1, 2 and 3 of the system are shown in connection with the control valve device but the other parts of the system may be the same as shown in a prior filed application of Donald L. McNeal, Serial No. 404,813, filed July 31, 1941.

The control valve device comprises a casing having a valve portion 4, tubular body portion 5, and a bonnet or cover 6. As shown these casing portions are made separate from each other and are vertically arranged in axial alignment, the upper end of the portion 4 and the lower end of the portion 5 being clamped together by means of bolts 7. The bonnet or cover 6 is clamped to the upper end of the portion 5 by means of bolts 8.

Formed in the valve portion 4 of the casing is a supply chamber 9 which is in constant open communication with the inlet pipe 1, and contained in this chamber is a supply valve 10 having a fluted stem 11 which is slidably guided in a guide member 12 having a pressed fit with the interior of the casing, the fluted stem being adapted, when the valve 10 is unseated to establish communication from the valve chamber 9 to a chamber 13 which is in constant open communication with the outlet pipe 1. Also contained in chamber 9 is a spring 14 which, at all times, biases the supply valve 9 toward its seated position.

Slidably guided in the casing portion 4 in axial alignment with the supply valve 9 is a movable abutment 15 which, in the present embodiment of the invention, is in the form of a piston having one of its faces exposed to the chamber 13 and its opposite face exposed to the interior of the portion 5 of the casing. The abutment is provided with a central longitudinally extending through bore and a counter bore 16 forming a recess in that face of the plunger which is open to the chamber 13. Slidably mounted in the bore and extending into the counter bore is a hollow plunger 17 of small diameter in cross section. The lower end portion of this hollow plunger is provided with an annular shoulder 18 upon which the movable abutment 15 normally rests, the plunger being supported by a spring 19 contained in chamber 13 and operatively engaging the shoulder 18 of the plunger and the guide member 12.

The lower end of the plunger is open and is provided with a valve seat 20 which, as will hereinafter more fully appear, is adapted to engage an exhaust valve 21 provided on the upper end of the fluted stem 11 of the supply valve 9. The upper end of the plunger is closed, and just below this closed end, openings 22 are provided which extend laterally from the exterior to the interior of the plunger.

The outer surface of the closed end of the plunger is curved upwardly in the form of a portion of a sphere so as to provide an axial point contact with a movable plunger which will presently be described in detail.

The upper surface of the abutment 15 is curved upwardly in the form of a portion of the sphere for the purpose of eliminating as will be later described cocking of the abutment relative to the casing when it is being operated.

Contained in the portion 5 of the casing is a vertically movable tubular member 23 having at its lower end a circular collar 24 which is slidably guided by the casing and which serves as a spring seat for the lower end of a control spring 25, the upper end of which spring is seated on an inwardly extending circular spring seat 26 integrally formed on the interior of the casing portion 5. The upper end portion of the member 23 extends through a central opening in the spring seat 26 and is slidably guided therein. This end of the member is provided with a plurality of circumferentially spaced longitudinally extending notches or recesses 27 which are open at their upper ends for the reception of locking lugs 28 of a rotatable adjusting member 29 which is normally clamped rigidly against rotation between the bonnet 6 and the casing portion 5.

Below the lower ends of the recesses 27, the member 23 is provided with internal screw threads 30 which have a fast lead. Contained in the member 23 is a valve operating assembly which comprises a rotatable plunger member having an upper head portion 31 which is provided with external screw threads 32 meshing with the screw threads 30 of the member 23. The plunger member also comprises a downwardly extending stem 33 which may be integral with the head portion 31, and which, at its lower end, engages the upper rounded end of the stem 17 of the exhaust valve seat member. The upper end of the plunger member is axially recessed and is provided with splines for the reception and interengagement of the correspondingly splined lower end portion 34 of a rotatable operating shaft 35 which is journaled, a short distance above the spline portion, in the adjusting member 29.

The valve operating assembly also comprises a member 36 which is slidably mounted on the lower end of the plunger stem 33 for limited movement longitudinally of the stem. This member 36 is keyed on the stem as shown for rotation therewith and is provided with external screw threads 37 which mesh with the internal screw threads 30 of the member 23.

The valve operating assembly further comprises a spring 38 which encircles the stem 33 and which is interposed between and operatively engages the lower side of the head portion 31 and the upper side of the members 36. This spring is initially compressed so that it tends, at all times, to urge the plunger member and the member 36 away from each other vertically. Before the valve operating assembly is positioned within the member 23, a retaining ring 39 will hold the member 36 on the plunger stem, however when the assembly is properly positioned within the member 23, the member 36 will be spaced upwardly from the retaining ring as shown in Fig. 1.

This spacing of the member 36 with relation to the retaining ring may be accomplished in the following manner when the assemblage is being mounted in the member 23 and before the member 23 is positioned in the casing. The screw threads of the member 36 are first caused to interengage with the internal threads of the member 23. The assemblage is then screwed downwardly until the lower side of the head 31 is within a short distance of the beginning of the screw threads 30. Now the head is forced downwardly against the opposing pressure of the spring 38 until the external threads of the head are in position to engage with the internal threads of the member 23. During this downward movement of the plunger member, the member 36 may be held against rotation by a suitable tool which may be inserted through the lower end of the member 23 into holding engagement with the member 36. With the head 31 thus positioned and the holding tool still in engagement with the member 36, the assemblage and tool are rotated to cause the interengagement of the screw threads of the head and the member 23. The tool may now be removed and the assemblage screwed to its proper position as shown in Fig. 1. As an alternative method, the valve operating assemblage may be mounted from the lower end of the member 23. When this method of assembling is employed, the head portion 31 is screwed into the member 23 until the member 36 is within a short distance of the lower ends of the screw threads and with the head 31 held against rotation by means of any suitable tool, the member 36 is forced into position for interengagement of the screw threads with the lower ends of the screw threads of the member 23 The assemblage as a whole is now rotated causing the interengagement of the screw threads of the members 36 and 23. The assemblage may be now screwed as a unit to the position in which it is shown in Fig. 1.

From the foregoing description it will be obvious that the spring 38, since it tends to force the head 31 and member 36 apart, will increase the friction between the interengaging screw threads of the member 23 and the head 31 and also between the interengaging screw threads of the members 23 and 26 to such extent as to prevent unintentional relative movement between the members 23 and the valve operating assembly.

Secured to the lower end of the member 23 by means of screw threads is a plug 40 having a central bore through which the upper end of the stem 17 of the exhaust valve seat member extends and in which the stem is slidably guided. The lower face of the plug normally rests on an annular support 41 carried by the valve portion 4 of the casing, which face is adapted to be engaged in the immediate vicinity of the stem 17 by a portion of the spherical upper face of the movable abutment 15. Due to the curvature of the face of the abutment the engagement may be said to be a circular line contact. The plug is also provided with spaced openings 42 through which the interior of the member 23 is open to the interior of the casing portion 5.

The upper end of the operating shaft 35 extends above the adjusting member 29 and into the bonnet 6, and has keyed thereto an operating handle 43, whereby the operating shaft may be rotated. The lower face of the hub of the handle rests on a cover plate or washer 44 which is supported by the upper end of the adjusting member 29. The handle 43 and shaft 35 are secured together by means of nuts 45 and 46 which have screw threaded connection with the extreme upper end portion of the shaft.

The upper end portion of the adjusting member 29 is provided with an axial recess 47 in which there is mounted a packing device 48 which closely engages the shaft 35 and thereby prevents the passage of dust or other undesirable foreign matter to the interior of the device.

Exteriorly, the adjusting member 29 is provided with a plurality of spaced radially arranged teeth 49 which are adapted to be engaged by a screw driver or other suitable tool for rotating the adjusting member when it is desired to adjust the device to provide the proper operation of the supply and exhaust valves, the teeth being accessible through an open space or notch 50 provided in the bonnet 6.

The casing portion 5 is provided with exterior lugs 51 which are adapted to be rigidly secured to any convenient support.

*Adjusting the device for operation*

When the parts of the control valve device are assembled and before the bonnet 6 is clamped tight, the adjusting member 29 is rotated in either a clockwise or counterclockwise direction. Due to the fact that this member is interlocked with the member 23, the rotary motion of the member 29 is transmitted to the member 23. As the member 23 rotates, the valve operating assembly will be held against axial rotation by means of the handle which will be held in its release position by the person adjusting the device, so that the assemblage, due to its screw threaded connection with the member 23, will be moved upwardly or downwardly, as the case may be, relative to the member 23 until the assemblage and the control valves and associated parts are in their proper operative positions as shown in Fig. 1. The bonnet 6 is now clamped down so as to lock the adjusting member 29 against accidental rotation, thereby locking the other associated parts in their proper positions.

*Operation of the device*

With the several parts of the device properly adjusted and it is desired to permit the displacement of liquid from the supply pipe 1 and connected valve chamber 9 to the chamber 13 and connected outlet pipe 2, the operator moves the handle 43 and thereby the shaft 35 and valve operating assemblage in a counterclockwise direction. As the assemblage is thus moved it is, due to its threaded connection with the member 23, propelled downwardly relative to the member, thereby moving the stem 17 and associated exhaust valve seat 20 downwardly first causing the seat to engage the valve to close the exhaust communication from the chamber 13 and then actuating the supply valve 10 to permit the liquid under pressure to flow from the chamber 9 to the chamber 13 of pipe 2. The liquid under pressure in chamber 13 causes the movable abutment 15 to move upwardly into engagement with the lower face of the plug 40.

Now when the pressure of the liquid in chamber 13 is sufficient to overcome the pressure of the large control spring 25, the piston will move the member 23 and valve operating assemblage upwardly as a unit, the spring 19 acting to move the release valve seat member upwardly with the valve operating assemblage, and the spring 14 acting to at the same time seat the supply valve 10. When the supply valve seats, there can be no further increase in the pressure of liquid in the chamber 13 and consequently the movable abutment 15 and thereby the member 23 and valve operating assemblage will come to a stop before the valve seat 20 can move out of engagement with the exhaust valve 21, thus the pressure called for by the position of the handle will be maintained in the chamber 13 and pipe 2.

If it is desired to increase the pressure of liquid in chamber 13 and pipe 2, the handle 43 is moved further in a counterclockwise direction causing the valve operating assembly to move downwardly again relative to the member 23 to unseat the supply valve 10, thereby permitting liquid under pressure to again flow to chamber 13 and pipe 2. When the pressure of liquid in chamber 13 has been increased to that called for by the new position of the handle, the several parts of the device will function to effect the closing of the supply valve in the same manner as described above.

When it is desired to reduce the pressure of the liquid in chamber 13 and pipe 2, the handle 43, and thereby the shaft 35 and valve operating assemblage are moved in a clockwise direction. Upon such movement the valve operating assemblage moves upwardly relative to the member 23, permitting the spring 19 to move the exhaust valve seat member upwardly. Since the supply valve 9 is seated, the exhaust valve 21 cannot follow the upward movement of the valve seat member and as a consequence the exhaust valve seat 20 moves out of engagement with the exhaust valve, thus establishing communication from the chamber 13 and pipe 2 to the exhaust pipe by way of the interior of the stem 17, openings 22 in the stem, the interior of the member 23, openings 42 in the plug 40, and the interior of the casing section 5. Through this communication liquid escapes from the chamber 13 and pipe 2 to the pipe 3 and of course effects a reduction in the pressure of the liquid in the chamber and pipe. Now when the pressure of the liquid in chamber 13 is reduced to that called for by the position of the handle, the control spring 25 acts to move the member 23 and valve operating assemblage and exhaust valve seat member downwardly as a unit until the exhaust valve seat 20 of the valve seat member engages he exhaust valve 21. Upon such engagement the exhaust flow of liquid from the chamber 13 is cut off and as a result the moving parts will come to a stop without unseating the supply valve 10, so that the pressure called for by the position of the handle will be maintained in chamber 13.

If, when the several parts of the device are in their lapped position, an unwanted reduction in the pressure of liquid in chamber 13 should occur the control spring 25 will act to unseat the supply valve 10 to permit liquid to flow from the supply chamber 9 and pipe 1 to the chamber 13, the valve being permitted to close when the pressure of liquid has been increased sufficiently to compensate for the unwanted reduction.

It will be noted that the clearance space provided between the lower end of the spline portion 34 of the operating shaft 35 and the bottom of the recess in the plunger 33 of the valve operating assemblage for insuring free vertical movement of the assemblage relative to the shaft, might, if the clearance in the spline connection between the shaft and plunger are slight, act as a dash pot to resist the movement of the assemblage. To prevent this the clearance space is maintained constantly open to the interior of the casing portion 5 through a passage 53 in the shaft.

The space above the spring seat 24 of the member is maintained constantly open to the exhaust pipe 3 by way of leakage grooves 54 which are formed in the casing portion 5. This arrangement eliminates the possibility of such space serving as a dash pot to resist upward movement of the member 23, and also eliminates the possibility of trapping the hydraulic medium within the space.

In Fig. 1, a plurality of annular shims have been shown interposed between the lower end of the spring 25 and the upper face of the spring seat 24. These shims may be removed or other shims added if for any reason it is found desirable to adjust the power of the spring 25.

General considerations

It will be understood that since the exhaust valve seat member is movable independently of the movable abutment 15, the greatest force acting to oppose the unseating of the supply valve is that of the liquid acting on the face of the valve over an area substantially equal to the cross sectional area of the stem 17 of the exhaust valve seat member. The valve springs 14 and 19 also act to oppose such movement but since these springs are very light, the resistance offered by them is negligible. This force reacting through the stem of the exhaust valve seat member is transmitted to the valve operating assemblage and tends to move the assemblage upwardly, but due to the friction increasing feature incorporated in the assemblage, the assemblage, as well as the operating handle, will remain stationary in the position to which it may have been moved by an operator. In practice it has been shown that the greatest total opposition offered to movement of the handle 43 may be overcome by a manual pressure of around five or six pounds.

It has also been shown in practice that the several parts of the device are so quick acting that the pressure of liquid in chamber 13 and pipe 2 may be easily increased or decreased in steps as low as five pounds when the pressure of the liquid in the supply chamber 9 is as high as five hundred to one thousand pounds per square inch. However, graduations of considerably less than five pounds may be effected if care is exercised in moving the operating handle 43, in fact, there is no limitation as to the fineness of the graduations it is possible to obtain.

Having now described my invention, what I claim as new and desire to secure by Letters Patent is:

1. A self-lapping control valve device comprising a casing having an outlet chamber to which fluid under pressure may be supplied, a movable abutment in said chamber subject on one side to the pressure of fluid in said chamber, valve means having an actuating stem slidably guided in said abutment, said stem and abutment being movable independently of each other, means manually rotatable for actuating said stem relative to said abutment to effect the operation of said valve means to supply fluid under pressure to said chamber, regulating means, operable by said abutment acting in response to an increase in the pressure of fluid in said chamber, for actuating the manually rotatable means to effect the operation of said valve means to limit the supply of fluid under pressure to said chamber.

2. A self-lapping control valve device comprising a casing having an outlet chamber to which fluid under pressure may be supplied, a movable abutment in said chamber subject on one side to the pressure of fluid in said chamber, valve means having an actuating stem slidably guided in said abutment, said stem and abutment being movable independently of each other, manually operable means for actuating said stem relative to said abutment to effect the operation of said valve means to supply fluid under pressure to said chamber, and regulating means operable by said abutment acting in response to the increase in the pressure of fluid in said chamber for effecting the operation of said manually operable means and thereby the operation of said valve means to limit the supply of fluid under pressure to said chamber.

3. A self-lapping control valve device comprising a casing having an outlet chamber to which fluid under pressure may be supplied, valve means normally establishing an exhaust communication from said chamber and being operative to close said communication and to establish a supply communication through which fluid under pressure is supplied to said chamber, regulating means responsive to the pressure of fluid in said chamber for effecting the operation of said valve means to cut off the supply of fluid under pressure to said chamber, and means carried by said regulating means operative relative thereto to actuate said valve means to close said exhaust communication and to establish said supply communication, and means carried by said casing operative to actuate the valve actuating means relative to the regulating means, said valve actuating means being operative by said regulating means to effect the operation of said valve means to close said supply communication.

4. A self-lapping control valve device comprising a casing having an outlet chamber to which fluid under pressure may be supplied, valve means normally establishing an exhaust communication from said chamber and being operative to first close said exhaust communication and then to establish a supply communication through which fluid under pressure is supplied to said chamber, regulating means responsive to the pressure of fluid in said chamber for effecting an operation of said valve means to cut off the supply of fluid under pressure to said chamber, means movable relative to the regulating means distances varying with the degree of pressure it is desired to obtain in said chamber to actuate said valve means to establish the fluid pressure supply communication, the valve actuating means being movable by said regulating means to effect the operation of said valve means to cut off the flow of fluid under pressure to said chamber.

5. A self-lapping control valve device comprising a casing having an outlet chamber to which fluid under pressure may be supplied, valve means normally establishing an exhaust communication from said chamber and being operative to first close said exhaust communication and to then establish a supply communication through which fluid under pressure is supplied to said chamber, regulating means responsive to the pressure of fluid in said chamber for effecting the operation of said valve means to cut off the supply of fluid under pressure to said chamber, means having screw threaded connection with the regulating means for movement longitudinally thereof upon the rotation of the means relative thereto to actuate said valve means to cut off said exhaust communication, to establish said supply communication and to control the valve means to provide the desired pressure in said chamber, means for at all times preventing unwanted rotation of the screw threaded means, the screw threaded means being movable with said regulating means to effect the operation of said valve means to cut off the flow of fluid under pressure to said chamber.

6. A self-applying control valve device comprising a casing having an inlet chamber, an outlet chamber and an exhaust chamber, an exhaust valve mechanism operative to control the communication between the outlet chamber and the exhaust chamber, a supply valve for controlling communication from the inlet chamber to the outlet chamber, a movable regulating mechanism in said exhaust chamber, means cooperating with said regulating mechanism and movable at one time relative thereto for actuating said exhaust valve mechanism to close communication between the outlet chamber and the exhaust chamber and to then actuate said supply valve to establish the communication from the inlet chamber to the outlet chamber and movable at another time by the regulating mechanism for effecting the operation of said supply valve to effect the closing of the communication between the inlet chamber and the outlet chamber, and a movable abutment operative upon an increase in the pressure of fluid in the outlet chamber for actuating said regulating mechanism.

7. A self-lapping control valve device comprising a casing having an outlet chamber to which fluid under pressure may be supplied, a regulating means comprising a movable abutment slidably mounted in the casing and subject on one face to the pressure of fluid in said chamber and also comprising a movable sleeve element slidably guided in said casing and further comprising a regulating spring interposed between and operatively engaging said sleeve element and casing, valve means axially arranged with respect to said abutment and movable member and normally establishing an exhaust communication from said chamber and being operative to close said exhaust communication to establish a supply communication through which under pressure is supplied to said chamber, a member passing axially through said abutment and slidably guided therein for axial movement relative to the abutment for controlling the operation of said valve means, means contained in said sleeve element and movable relative thereto axially for actuating said member and thereby said valve means to establish said supply communication, and means urging said valve means to the supply communication closing position, said abutment being responsive to the pressure supplied to said chamber for actuating said sleeve element and said means contained in the element in unison to effect the operation of said valve means to close said supply communication to said chamber.

8. A self-lapping control valve device comprising a casing having an outlet chamber, valve means operative to supply fluid under pressure to said chamber, means displaceable in one direction from a normal position upon rotation to actuate said valve means to supply fluid under pressure to said chamber, manually operative means for rotating said rotatable means, a control spring, and control means subject to the opposing pressures of the control spring and the pressure of fluid in said chamber and operative when the pressure of fluid in said chamber exceeds the opposing pressure of the control spring to displace the displaceable means in the opposite direction and without imparting rotary motion thereto for effecting the operation of said valve means to cut off the supply of fluid under pressure to said chamber.

9. A self-lapping control valve device comprising a casing having an outlet chamber, control means comprising a movable abutment having one face exposed to said outlet chamber, and also comprising a control spring and a movable control member interposed between and subject to the opposing pressures of the spring and abutment, and being operative by said abutment when the force of said abutment, under the influence of the pressure of fluid in said chamber, exceeds the opposing force of said control spring, valve means operative to supply fluid under pressure to said chamber and to cut off the supply of fluid under pressure to the chamber, a plunger slidably mounted in said abutment and operative to control the operation of said valve means, means carried by said control member and being movable relative thereto for actuating said plunger to effect the operation of said valve means to supply fluid under pressure to said chamber, said means being movable in unison with said control member under the influence of the force of said abutment to effect the operation of said plunger and thereby said valve means to cut off the supply of fluid under pressure to said chamber.

10. A self-lapping control valve device comprising a casing having an outlet chamber, control means comprising a movable abutment having one face exposed to said outlet chamber, and also comprising a control spring and a movable control member interposed between and subject to the opposing pressure of said spring and abutment and being operative by said abutment when the force of said abutment, under the influence of the pressure of fluid in said chamber, exceeds the opposing force of said control spring, valve means operative to supply fluid under pressure to said chamber and to cut off the supply of fluid under pressure to the chamber, a plunger slidably mounted in said abutment and operative to control the operation of said valve means, means having screw threaded engagement with said control member for relative movement longitudinally thereof upon rotation relative to the control member for actuating said plunger and thereby said valve means to supply fluid under pressure to said chamber, and an element for rotating said means, said means being movable in unison with said control member and relative to said element under the influence of the force of said abutment to effect the operation of said plunger and thereby said valve means to cut off the supply of fluid under pressure to said chamber.

11. A self-lapping control valve device comprising a casing having an outlet chamber, control means comprising a movable abutment having one face exposed to said outlet chamber, and also comprising a control spring and a movable control member interposed between and subject to the opposing pressure of the spring and abutment and being operative by said abutment when the force of said abutment, under the influence of the pressure of fluid in said chamber, exceeds the opposing force of said control spring, valve means normally establishing an exhaust communication from said chamber and being operative to close said communication and to supply fluid under pressure to said chamber and to cut off the supply of fluid under pressure to the chamber, a plunger slidably mounted in said abutment and operative to control the operation of said valve means, and means cooperating with the screw threaded means for immobilizing the screw threaded means against movement relative to the control member other than by the use of said element.

12. A self-lapping control valve device comprising a casing having an outlet chamber, control means comprising a movable abutment having one face exposed to said outlet chamber, and also comprising a control spring, a movable control member interposed between and subject to the opposing pressure of the spring and abutment and being operative by said abutment when the force of said abutment, under the influence of the pressure in said chamber, exceeds the opposing force of said control spring, valve means normally establishing an exhaust communication from said chamber and being operative to close said communication and to supply fluid under pressure to said chamber and to cut off the supply of fluid under pressure to the chamber, a plunger slidably mounted in said abutment and operative to control the operation of said valve means, an operating member having screw threaded connection with said control member for relative movement longitudinally thereof upon rotation relative to the control member for actuating said plunger and thereby said valve means to supply fluid under pressure to said chamber, a friction member slidably mounted on the valve operating member and having screw threaded connection with said control member, said friction member being rotatable and movable longitudinally of the control member with said operating member, a spring biasing said valve operating member and friction member in opposite directions so as to increase the frictional resistance of the members to rotary movement, a manually operative element mounted in the casing for rotating the operating member, said operating member and friction member being movable in unison with said control member under the influence of the force of said abutment to effect the operation of said plunger and thereby said valve means to cut off the supply of fluid under pressure to said chamber.

13. In a self-lapping control valve device comprising a casing having an outlet chamber, valve means in said casing operative to admit fluid under pressure to said chamber, to exhaust fluid under pressure from said chamber and for automatically limiting either the supply of fluid to or the exhaust of fluid from the chamber, a spring, control means in said casing subject to the opposing pressures of said spring and fluid in said chamber and operative upon variations in the pressure of fluid in the chamber for controlling the operation of said valve means to limit the supply or the exhaust of fluid from the chamber, and actuating means carried by said control means forming the control connection between said control means and valve means and operative relative to the control means for effecting the operation of said valve means to supply fluid under pressure to or to exhaust fluid under pressure from said chamber, an element included in said control means movable relative to said actuating means to adjust the actuating means to provide the desired controlled operations of the device, and means carried by the casing and accessible from the exterior of the casing for operation to actuate said element.

14. In a self-lapping control valve device comprising a casing having an outlet chamber, valve means in said casing operative to admit fluid under pressure to said chamber, to exhaust fluid under pressure from said chamber and for automatically limiting either the supply of fluid to or the exhaust of fluid from the chamber, a spring, control means in said casing subject to the opposing pressures of said spring and fluid in said chamber and operative upon variations in the pressure of fluid in the chamber for controlling the operation of said valve means to limit the supply or the exhaust of fluid from the chamber, and actuating means carried by said control means forming the control connection between said control means and valve means and operative relative to the control means for effecting the operation of said valve means to supply fluid under pressure to or to exhaust fluid under pressure from said chamber, an element included in said control means movable relative to said actuating means to adjust the actuating means to provide the desired controlled operations of the device, and means carried by the casing and accessible from the exterior of the casing for operation to actuate said element, the last mentioned means having a lost motion connection with said element to permit movement of the control means in its operation to control the operation of said valve means.

15. In a self-lapping control valve device comprising a casing having an outlet chamber, valve means in said casing operative to admit fluid under pressure to said chamber, to exhaust fluid under pressure from said chamber and for automatically limiting either the supply of fluid to or the exhaust of fluid from the chamber, a spring, control means in said casing subject to the opposing pressures of said spring and fluid in said chamber and operative upon variations in the pressure of fluid in the chamber for controlling the operation of said valve means to limit the supply or the exhaust of fluid from the chamber, and actuating means carried by said control means forming the control connection between said control means and valve means and operative relative to the control means for effecting the operation of said valve means to supply fluid under pressure to or to exhaust fluid under pressure from said chamber, an element included in said control means movable relative to said actuating means to adjust the actuating means to provide the desired controlled operations of the device, and means carried by the casing and accessible from the exterior of the casing for operation to actuate said element, the last mentioned means being normally locked against movement and having lost motion connection with said element to provide for movement of the element relative thereto when the control means functions to control said valve means.

16. In a self-lapping control valve device comprising a casing having an outlet chamber, valve means in said casing operative to admit fluid under pressure to said chamber, to exhaust fluid under pressure from said chamber and for automatically limiting either the supply of fluid to or the exhaust of fluid from the chamber, a spring, control means in said casing subject to the opposing pressures of said spring and fluid in said chamber and operative upon variations in the pressure of fluid in the chamber for controlling the operation of said valve means for limiting the supply of fluid to or the exhaust of fluid from the chamber, said control means comprising an element which is slidably mounted in the casing for longitudinal and rotary movement, means carried by said casing normally holding said element against rotary movement and being operative to rotate the element, screw threaded means having screw threaded connection with said element so as to move relative to the element to effect the operation of said valve means, said screw threaded means, due to its screw threaded connection with said element being movable longitudinally of the element upon rotation of the element relative to the screw threaded means for adjusting the screw threaded means to produce the desired control of the device and said screw threaded means forming the operating connection between said control means and said valve means, and a lost motion connection between said element and the element holding and rotating means to permit the free longitudinal movement of the element relative to the means when the control means functions to control the operation of said valve means.

EARLE S. COOK.